(12) United States Patent
Maeyama et al.

(10) Patent No.: US 9,333,798 B2
(45) Date of Patent: May 10, 2016

(54) VEHICLE WHEEL, RUNNING WHEEL, VEHICLE AND METHOD OF ASSEMBLING AND DISASSEMBLING VEHICLE WHEEL

(75) Inventors: Hiroyuki Maeyama, Tokyo (JP);
Hiromichi Yamamoto, Tokyo (JP);
Kousuke Katahira, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 424 days.

(21) Appl. No.: 13/814,021

(22) PCT Filed: Jul. 15, 2011

(86) PCT No.: PCT/JP2011/066218
§ 371 (c)(1),
(2), (4) Date: Feb. 4, 2013

(87) PCT Pub. No.: WO2012/086246
PCT Pub. Date: Jun. 28, 2012

(65) Prior Publication Data
US 2013/0127234 A1    May 23, 2013

(30) Foreign Application Priority Data

Dec. 21, 2010    (JP) .................................. 2010-284851

(51) Int. Cl.
*B60B 3/08*    (2006.01)
*B60B 25/00*    (2006.01)
(Continued)

(52) U.S. Cl.
CPC . *B60B 3/087* (2013.01); *B60B 7/14* (2013.01);
*B60B 23/10* (2013.01); *B60B 25/002* (2013.01);
(Continued)

(58) Field of Classification Search
CPC ........ B60B 3/08; B60B 3/087; B60B 25/002;
B60B 25/006; B60B 25/22; B60B 23/10;
B60B 7/14; Y10T 29/49494; B60C 25/01;
B60C 17/04
USPC .......... 152/405, 427, 396, 402; 301/10.1, 9.1,
301/11.1, 95.11
See application file for complete search history.

(56) References Cited

U.S. PATENT DOCUMENTS 3,712,680 A * 1/1973 Hyland et al. ............ 301/64.303
4,043,374 A * 8/1977 Smith ........................... 152/405
(Continued)

FOREIGN PATENT DOCUMENTS

CN    2051178    1/1990
CN    2524975    12/2002
(Continued)

OTHER PUBLICATIONS

Korean Office Action issued Apr. 29, 2014 in corresponding Korean Patent Application No. 10-2013-7001827 with English translation.
(Continued)

*Primary Examiner* — Kip T Kotter
(74) *Attorney, Agent, or Firm* — Wenderoth, Lind & Ponack, L.L.P.

(57) ABSTRACT

A vehicle wheel, which is divided in an axial direction of a tire into two pieces which are an in-side half wheel and an out-side half wheel that are connected to each other and fixed to an axle hub, includes wheel coupling bolts joining a mating surface of the in-side half wheel and a mating surface of the out-side half wheel together, and hub bolts joining the out-side half wheel and the axle hub together. The wheel coupling bolts and the hub bolts are respectively screwed into nuts from the out-side half wheel side.

10 Claims, 6 Drawing Sheets

(51) Int. Cl.
  *B60B 7/14*    (2006.01)
  *B60B 23/10*   (2006.01)
  *B60C 25/01*   (2006.01)
  *B60C 17/04*   (2006.01)

(52) U.S. Cl.
  CPC ............... *B60B 25/006* (2013.01); *B60C 25/01* (2013.01); *B60C 17/04* (2013.01); *B60Y 2200/11* (2013.01); *B60Y 2200/14* (2013.01); *Y10T 29/49494* (2015.01)

(56) References Cited

U.S. PATENT DOCUMENTS

| | | | |
|---|---|---|---|
| 5,022,450 | A | 6/1991 | Weeks |
| 5,215,137 | A * | 6/1993 | Weeks et al. ............... 152/379.4 |
| 7,404,412 | B2 * | 7/2008 | Milanovich et al. .......... 137/226 |
| 8,505,598 | B2 * | 8/2013 | Marsaly et al. ............... 152/405 |
| 2004/0195902 | A1 * | 10/2004 | Hamada ........................ 301/10.1 |

FOREIGN PATENT DOCUMENTS

| | | |
|---|---|---|
| CN | 1429985 | 7/2003 |
| CN | 1899859 | 1/2007 |
| JP | 47-11601 | 6/1972 |
| JP | 54-3701 | 1/1979 |
| JP | 54-17202 | 6/1979 |
| JP | 59-42702 | 3/1984 |
| JP | 3-224801 | 10/1991 |
| JP | 6-32105 | 4/1994 |
| JP | 07-028701 | 5/1995 |
| JP | 2002-240519 | 8/2002 |
| JP | 2004-309396 | 11/2004 |
| JP | 2005-193851 | 7/2005 |
| JP | 2006-306334 | 11/2006 |
| JP | 2008-302858 | 12/2008 |
| JP | 4384508 | 12/2009 |
| JP | 2010-89566 | 4/2010 |

OTHER PUBLICATIONS

International Search Report issued Oct. 18, 2011 in International (PCT) Application No. PCT/JP2011/066218 with English translation.
Written Opinion of the International Searching Authority issued Oct. 18, 2011 in International (PCT) Application No. PCT/JP2011/066218 with English translation.
Chinese Office Action issued Sep. 3, 2014 in corresponding Chinese Patent Application No. 201180038503.2 with English translation.
Office Action issued Apr. 17, 2015 in Chinese Application No. 201180038503.2, with English language translation.

* cited by examiner

VEHICLE WHEEL, RUNNING WHEEL, VEHICLE AND METHOD OF ASSEMBLING AND DISASSEMBLING VEHICLE WHEEL

TECHNICAL FIELD

The present invention relates to a vehicle wheel, a running wheel, a vehicle, and a method of assembling and disassembling a vehicle wheel.

Priority is claimed on Japanese Patent Application No. 2010-284851, filed Dec. 21, 2010, the content of which is incorporated herein by reference.

BACKGROUND ART

In the past, in a new transportation system such as a monorail or a subway, a vehicle has been known that adopts a tire with an inner safety wheel that supports a tubeless pneumatic tire from the inside when the inner pressure of the tubeless pneumatic tire is reduced. In a wheel of such a pneumatic tire, a bead portion of the tire is locally opened, an inner safety wheel is assembled inside, and a rubber sheet is then mounted. Then, the wheel provided with the inner safety wheel is set in a press fitting jig and moved onto a wheel in which a side ring is removed, and the tire is press-fitted to a rim by the jig. The side ring is placed on the tire, and the side ring is further press-fitted to the tire and pressed until a groove for a lock ring is visible. Then, the lock ring is caught and assembled in the groove and air is then put into the tire, and consequently a wheel is completed. Afterward, when the tire is replaced due to wear or the like, the tire is detached using a special press fitting jig according to the reverse procedure of the assembly procedure.

Incidentally, there is a vehicle wheel in which a plurality of engagement places are mounted at mating portions of two-divided wheels (refer to, for example, Patent Literature 1).

In Patent Literature 1, after bead portions of a tire are press-fitted to the respective rims, engagement portions of the respective rims are put together. Then, after holes for hub bolts are aligned with each other by relatively rotating the respective rims, the wheel is mounted on an axle hub. Then, air is put into the tire and the tire is assembled, and this tire is disclosed.

CITATION LIST

Patent Literature

Patent Literature 1: Japanese Unexamined Patent Application, First Publication No. 2008-302858

SUMMARY OF INVENTION

Technical Problem

However, in a vehicle wheel in the related art, there are the following problems.

That is, in Patent Literature 1, if air is put into the tire before the tire is mounted on a hub, there is a risk that the divided wheels disengage from the tire. Further, the divided wheels are provided with divided rims in order to facilitate rim assembly of a hard tire, and after beads of the tire are press-fitted to the respective split rims, it is necessary to rotate the respective split rims in relative directions and engage the rims with each other. However, this work is time-consuming, and thus a lot of time is required. In addition, usually, after the tire is mounted on the rim, air is put into the tire to make a running wheel, and the running wheel is then mounted on a vehicle. However, because of an engagement structure, there is a problem in that even if air is put into the tire, disengagement easily occurs.

Further, in tire replacement of a common tire wheel with an inner safety wheel, since a special jig having a hydraulic press function is required, locations where tires can be replaced are limited. In addition, since the tire replacement is special work performed by a skilled technician, there is a problem in that it is not possible to cope with a sudden puncture of the tire or the like when a vehicle is running.

The present invention has been made in view of the above-described problems and has an object of providing a vehicle wheel, a running wheel, a vehicle, and a method of assembling and disassembling a vehicle wheel in which improvements in work efficiency and workability pertaining to assembly and disassembly can be attained.

Solution to Problem

In order to achieve the above object, according to a first aspect of the present invention, a vehicle wheel, divided in an axial direction of a tire into two pieces which are an in-side half wheel and an out-side half wheel that are connected to each other and fixed to an axle hub, includes: first bolts joining a mating surface of the in-side half wheel and a mating surface of the out-side half wheel together; and second bolts joining the out-side half wheel and the axle hub together, wherein the first bolts and the second bolts are respectively screwed into nuts from the out-side half wheel side.

Further, according to a second aspect of the present invention, a method of assembling and disassembling the vehicle wheel according to the first aspect which is provided with a pneumatic tire includes: a first step of detaching the second bolts by loosening nuts from an outside of the out-side half wheel; a second step of reducing inner pressure by releasing air in the tire; a third step of detaching the first bolts by loosening nuts from the outside of the out-side half wheel; and a fourth step of separating the in-side half wheel and the out-side half wheel and detaching the in-side half wheel and the out-side half wheel from the tire, wherein the disassembling the vehicle wheel is performed in order from the first step to the fourth step when the vehicle wheel is detached from the tire, and the assembling the vehicle wheel is performed in reverse order of the disassembling when the vehicle wheel is mounted on the tire.

According to the above aspects of the invention, since in the out-side half wheel, the first bolts which are mounted on the in-side half wheel and the second bolts which are mounted on the axle hub are separately mounted, the assembly and disassembly of the in-side half wheel and the out-side half wheel and the assembly and disassembly of the out-side half wheel and the axle hub can be prevented from being performed at the same time. That is, when the tire is replaced, the wheel with a tire can be detached from the axle hub by first detaching the second bolts. At this time, since the in-side half wheel and the out-side half wheel are joined together by the first bolts, it is possible to maintain a good working state without separation of the wheels due to the inner pressure of the tire.

Further, since the out-side half wheel is mounted on the axle hub, even if the first bolts are mistakenly loosened, the object that may be blown due to the inner pressure of the tire is the in-side half wheel because the out-side half wheel and the axle hub are joined together by the second bolts, and thus, there is a safety advantage that the wheel does not fly toward the outer worker side.

Further, the vehicle wheel according to the first aspect described above preferably includes a first cover body covering first nuts that are screwed onto the first bolts.

In the vehicle wheel according to the first aspect described above, since the first nuts for the first bolts joining the in-side half wheel and the out-side half wheel together is covered by the first cover body, the first nuts are not visible from the outside. Then, since the first nuts cannot be loosened from the outside unless the first cover body is removed, it can be prevented that the in-side half wheel and the out-side half wheel are separated from each other by mistakenly removing the first bolts before the out-side half wheel and the axle hub are detached from each other.

Further, in the vehicle wheel according to the first aspect described above, the first cover body is preferably jointed by second nuts that are screwed onto the second bolts.

In this case, the first cover body can be detached from the out-side half wheel by loosening and removing the second the nuts from the second bolts. For this reason, when the wheel is disassembled, the disassembly procedure to first detach the out-side half wheel and the axle hub from each other, then loosen the first nuts, and separate the in-side half wheel and the out-side half wheel, can be carried out.

Further, the vehicle wheel according to the first aspect described above preferably includes a fit joint type mating portion protruding from one of the mating surfaces of the in-side half wheel and the out-side half wheel toward the other of the mating surfaces of the in-side half wheel and the out-side half wheel, and the fit joint type mating portion preferably extends over an entire circumference of the vehicle wheel.

In this case, misalignment of the in-side half wheel and the out-side half wheel with respect to an axle can be prevented by the fit joint type mating portion. Further, also when the two-divided wheels are assembled, since it becomes possible to easily coaxially position both the divided wheels by engaging the fit joint type mating portion protruding from the mating surface of the divided wheel on one side with the divided wheel on the other side, the assembly work can be made more efficient.

Further, the vehicle wheel according to the first aspect described above preferably further includes a second cover body covering the first bolts that are arranged at the in-side half wheel side.

In the vehicle wheel according to the first aspect described above, since the first bolts joining the in-side half wheel and the out-side half wheel together is covered by the second cover body, the first bolts are not visible from the outside. Then, since the first bolts cannot be removed unless the second cover body is removed, it can be prevented that the in-side half wheel and the out-side half wheel are separated from each other by mistakenly removing the first bolts before the out-side half wheel and the axle hub are detached from each other.

Further, in the vehicle wheel according to the first aspect described above, the in-side half wheel is preferably provided with an air hole communicating with a rim outer circumferential surface of the in-side half wheel, a whistle mechanism section that is fixed by a third nut and emits a warning sound due to air flowing through the air hole toward an inner circumference side from a rim outer circumference side is preferably mounted at an end portion on the rim inner circumference side of the air hole, and the second cover body is preferably jointed by the third nut of the whistle mechanism section.

In the vehicle wheel according to the first aspect described above, after the wheel is detached from the axle hub, the second cover body can be detached from the in-side half wheel by loosening and removing the third nut of the whistle mechanism section from the second cover body. That is, when the in-side half wheel and the out-side half wheel are disassembled, an attempt to detach the second cover body is made without releasing air in the tire. In this case, when the third nut of the whistle mechanism section is loosened, air in the tire flows to the rim inner circumference side through the air hole, and therefore the whistle mechanism section emits a warning sound. For this reason, after the inner pressure in the inside of the tire is reduced by an air valve until the warning sound disappears, the second cover body can be detached. Then, a disassembly procedure to loosen and remove the first nuts from the in-side half wheel and the out-side half wheel and to separate the in-side half wheel and the out-side half wheel from each other can be carried out.

Further, the vehicle wheel according to the first aspect described above may include a third cover body covering first nuts that are screwed onto the first bolts, and the out-side half wheel may be provided with a valve communicating with the inside of the tire. Further, the third cover body may be mounted at an opening portion of the valve and the third cover body may be jointed by a fourth nut.

In the vehicle wheel according to the first aspect described above, since the first nuts for the first bolts joining the in-side half wheel and the out-side half wheel together is covered by the third cover body, the first nuts are not visible from the outside. Then, since the first nuts cannot be loosened from the outside unless the third cover body is removed, it can be prevented that the in-side half wheel and the out-side half wheel are separated from each other by mistakenly removing the first bolts before the out-side half wheel and the axle hub are detached from each other.

Then, after the wheel is detached from the axle hub, the third cover body can be detached from the out-side half wheel by loosening and removing the fourth nut from the third cover body. That is, when the in-side half wheel and the out-side half wheel are disassembled, there is no need to release air in the tire. If an attempt to detach the third cover body is made, when the fourth nut is loosened, air in the tire flows to the outside of the out-side half wheel through the valve, and after the inner pressure in the inside of the tire is reduced, the third cover body can be detached.

Then, a disassembly procedure to loosen and remove the first nuts from the in-side half wheel and the out-side half wheel and to separate the in-side half wheel and the out-side half wheel from each other can be carried out.

Further, according to a third aspect of the present invention, a running wheel includes a wheel in which a tire is mounted on the vehicle wheel according to the first aspect described above.

Further, according to a fourth aspect of the present invention, a vehicle includes the running wheel according to the third aspect described above.

In the third and fourth aspects, since a tire is mounted on the vehicle wheel according to the first aspect described above, a running wheel or a vehicle with the high efficiency of assembly and disassembly work can be provided.

Advantageous Effects of Invention

According to the vehicle wheel, the running wheel, the vehicle, and the method of assembling and disassembling the vehicle wheel related to the aspects of the present invention, the first bolts that are mounted on the in-side half wheel and the second bolts that are mounted on the axle hub are separately mounted. For this reason, since the out-side half wheel is mounted on the axle hub, even if the first bolts are mistakenly loosened when the tire is replaced, the out-side half wheel and the axle hub are joined together by the second bolts. For this reason, there is no chance of the wheel flying toward the outer worker side, and improvements in work efficiency and workability and safety pertaining to assembly and disassembly can be attained.

DESCRIPTION OF EMBODIMENTS

Hereinafter, a vehicle wheel, a running wheel, a vehicle, and a method of assembling and disassembling a vehicle wheel according to embodiments of the present invention are described based on the drawings.

First Embodiment

Figure 1:
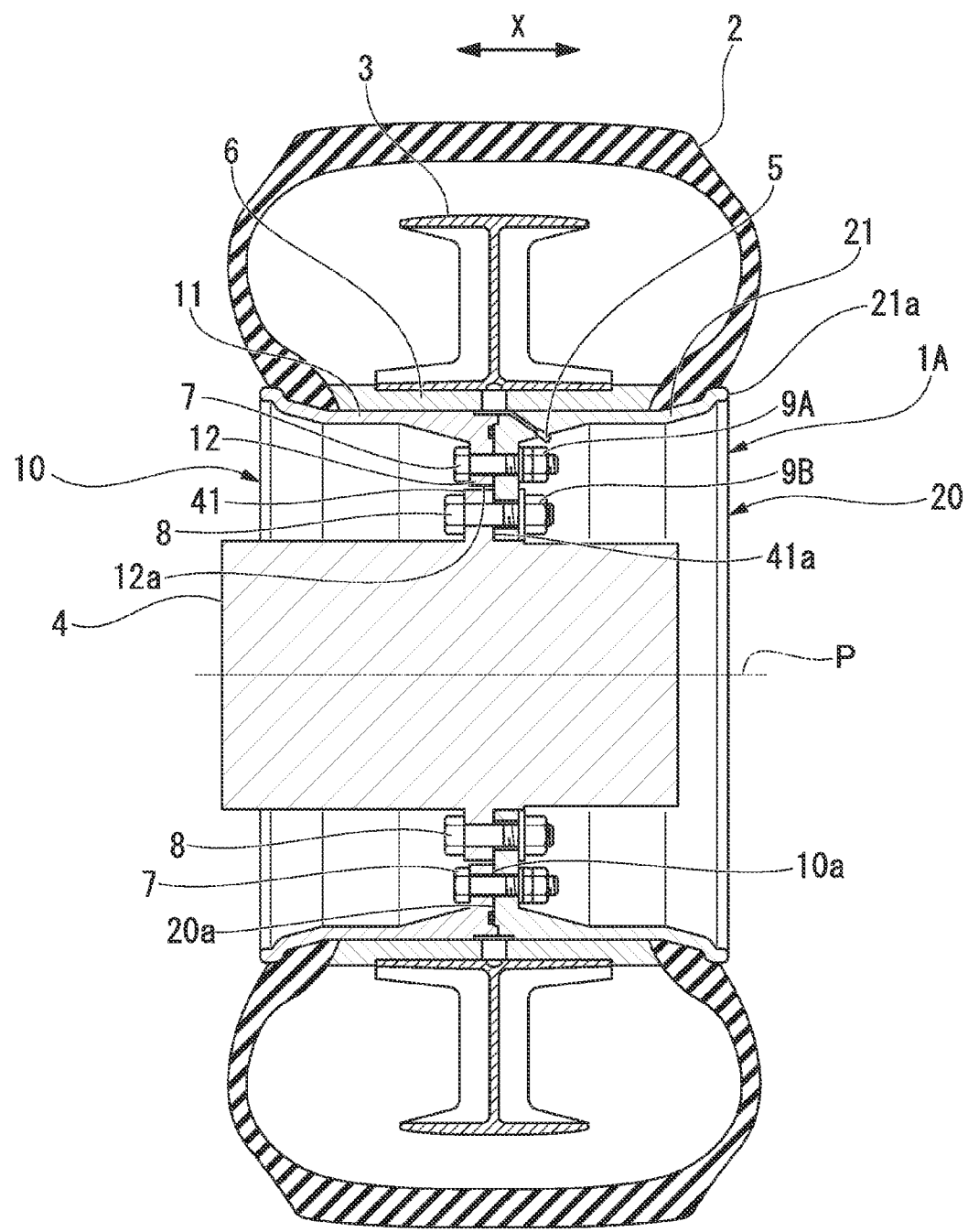
FIG. 1 is a cross-sectional view showing a running wheel according to a first embodiment of the present invention.

As shown in FIG. 1, a vehicle wheel (hereinafter simply referred to as a wheel 1A) according to the first embodiment is used in a tubeless tire (hereinafter simply referred to as a tire 2) with an inner safety wheel 3 incorporated in the inside.

Here, in FIG. 1, reference numeral 4 denotes an axle hub, reference numeral 5 denotes a valve, and reference numeral 6 denotes a rubber sheet which is mounted between the inner safety wheel 3 and rim flanges of the wheel 1A.

Figure 3:
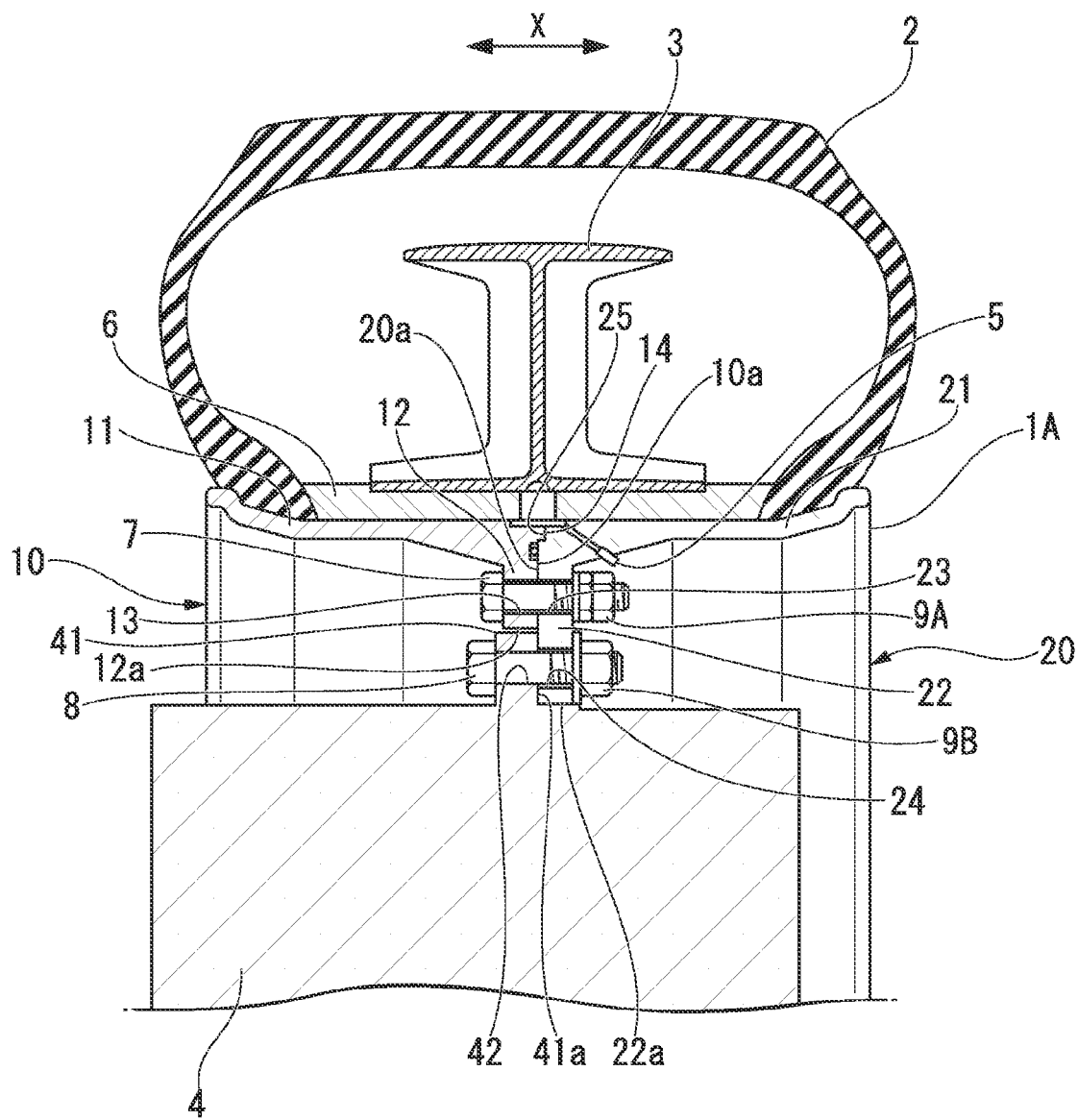
FIG. 3 is a partial enlarged view of the wheel shown in FIG. 1.

Then, in FIGS. 1 and 3, the left side of the drawing is the inside in a vehicle width direction and the right side of the drawing is also the outside in the vehicle width direction.

In addition, in the wheel 1A, a direction perpendicular to an axle P of the axle hub 4 is referred to as a diameter direction or a radial direction, a direction revolving around the axle P is referred to as a circumferential direction, and a direction parallel to the axle P is referred to as a width direction X.

Figure 2:
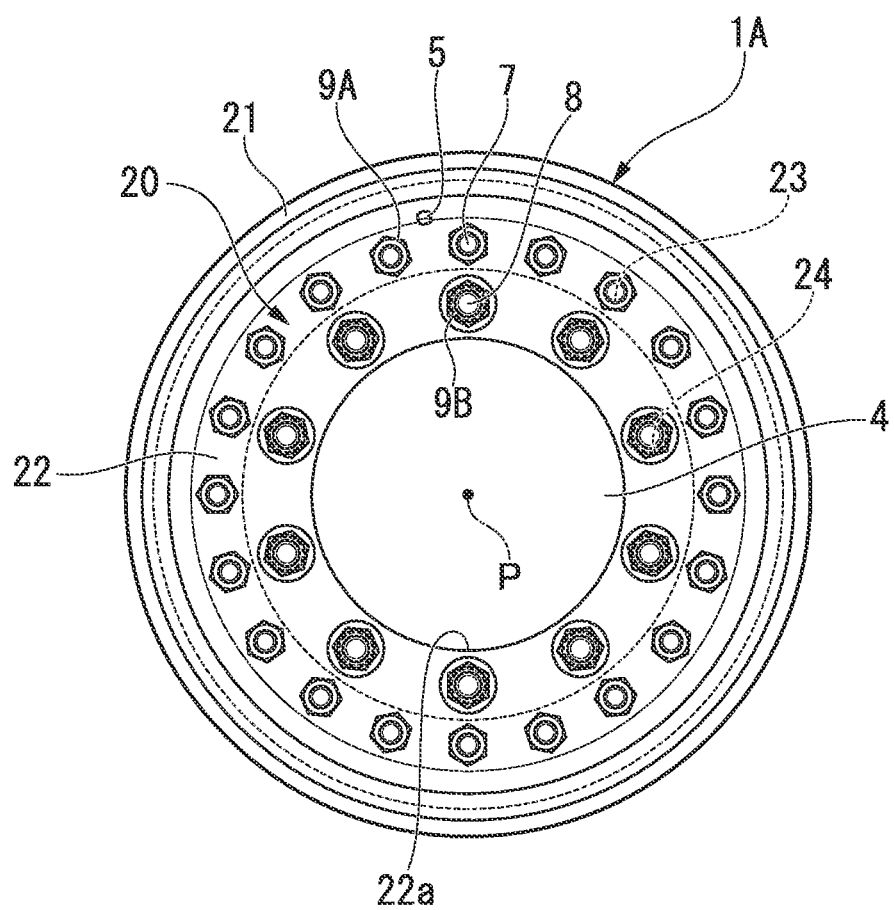
FIG. 2 is a side view when the wheel shown in FIG. 1 is viewed from the outside.

As shown in FIGS. 1 to 3, the wheel 1A is provided with a plurality of (in FIG. 2, twenty) wheel coupling bolts 7 (first bolts) and a plurality of (in FIG. 2, ten) hub bolts 8 (second bolts) joining an out-side half wheel 20 and the axle hub 4 together. The wheel coupling bolts 7 connect an in-side half wheel 10 and the out-side half wheel 20, that are pieces of the wheel 1A divided into two in a direction of the axle P, to each other, are fixed to the axle hub 4, and join a mating surface 10a of the in-side half wheel 10 and a mating surface 20a of the out-side half wheel 20 together. The wheel coupling bolts 7 and the hub bolts 8 are screwed into nuts 9A (first nuts) and hub nuts 9B (second nuts) from the out-side half wheel 20 side respectively.

The axle hub 4 is provided with a hub flange 41 protruding in the radial direction at a given position in an axial direction, and a plurality of (in FIG. 2, ten) hub bolt holes 42 that penetrate the hub flange 41 in a thickness direction along an outer peripheral portion of the hub flange 41 and are arranged at equal intervals in the circumferential direction.

The in-side half wheel 10 is provided with a rim section 11 which is fitted to a bead portion on one side in the width direction of the tire 2, and a disk section 12 which is fixed to the axle hub 4 on the vehicle side, and disposed inside in the width direction of a vehicle. The rim section 11 is annularly formed at a peripheral border of the disk section 12 and is provided with a rim flange arranged at an end portion in the axial direction of the rim section 11.

The disk section 12 has a circular opening portion 12a at the center, and on the outer periphery side thereof, is provided with a plurality of (in FIG. 2, twenty) outer periphery side bolt holes 13 arranged at equal intervals in the circumferential direction for the wheel coupling bolts 7. The size of the opening portion 12a is larger than the size of the outer diameter of the hub flange 41 of the axle hub 4.

The out-side half wheel 20 is provided with a rim section 21 which is fitted to a bead portion on the other side in the width direction of the tire 2, and a disk section 22 which is fixed to the axle hub 4 on the vehicle side, and disposed outside in the width direction of a vehicle. The rim section 21 is annularly formed at a peripheral border of the disk section 22 and is provided with a rim flange arranged at an end portion in the axial direction of the rim section 21.

The disk section 22 has a circular opening portion 22a at the center, and on the outer periphery side thereof, is provided with a plurality of (in FIG. 2, twenty) outer periphery side bolt holes 23 arranged at equal intervals in the circumferential direction for the wheel coupling bolts 7. A plurality of (in FIG. 2, ten) inner periphery side bolt holes 24 for the hub bolts 8 are arranged at equal intervals in the circumferential direction further to the inner periphery side than the plurality of outer periphery side bolt holes 23. The plurality of outer periphery side bolt holes 23 are disposed at the same positions in the radial direction and at the same intervals in the circumferential direction so as to correspond to the plurality of outer periphery side bolt holes 13 of the in-side half wheel 10. On the other hand, the inner periphery side bolt holes 24 are disposed at the same positions in the radial direction and at the same intervals in the circumferential direction so as to correspond to the plurality of hub bolt holes 42 of the axle hub 4.

Then, the out-side half wheel 20 is mounted on the hub flange 41 of the axle hub 4 from the outside. That is, the out-side half wheel 20 is mounted on the axle hub 4 with an outer surface 41a of the hub flange 41 and the mating face 20a of the out-side half wheel 20 put together.

The size of the opening portion 22a is set to be a size of the outer diameter where the axle hub 4 can be inserted into the opening portion 22a.

Then, in the mating surfaces 10a and 20a at which the in-side half wheel 10 and the out-side half wheel 20 are coupled together, a convex portion 14 (a fit joint type mating portion) protruding from the mating surface 10a side of the in-side half wheel 10 at the outer periphery side in the radial direction extends over the entire circumference in the circumferential direction. The mating surface 20a of the out-side half wheel 20 is provided with a concave portion 25 arranged over the entire circumference in the circumferential direction corresponding to the convex portion 14. The convex portion 14 is engaged with the concave portion 25, and therefore, misalignment of the in-side half wheel 10 and the out-side half wheel 20 with respect to the axle P can be regulated.

Further, in the mating surfaces at which the in-side half wheel 10 and the out-side half wheel 20 are coupled together, an 0-ring is mounted in order to prevent leakage of air in the tire 2 through the mating surfaces. In this way, the wheel 1A can also be applied to a tubeless tire.

Next, a method of assembling and disassembling the wheel 1A is described.

First, when the wheel 1A is detached from the tire 2, as shown in FIG. 1, the plurality of hub bolts 8 are detached by loosening the hub nuts 9B from the outside of the out-side half wheel 20 (a first step). Then, the hub flange 41 of the axle hub 4 and the out-side half wheel 20 are disengaged from each other, and thus an aggregate of the wheel 1A and the tire 2 can be detached from the axle hub 4. Then, a worker at this time can perform work without entering the inside of the vehicle, that is, the in-side half wheel 10 side. Then, air in the tire 2 is released through the valve 5, and the inner pressure of the tire 2 is reduced (a second step).

Next, the wheel coupling bolts 7 are detached by loosening the nuts 9A from the outside of the out-side half wheel 20 (a third step). Also at this time, the worker can perform work without entering the inside of the vehicle, that is, the in-side half wheel 10 side.

Then, the in-side half wheel 10 and the out-side half wheel 20 are separated from each other at the mating surfaces 10a and 20a and detached from the tire 2 (a fourth step).

In addition, in this embodiment, since the inner safety wheel 3 is incorporated in the tire 2, after the wheel 1A is detached from the tire 2, the inner safety wheel 3 is disassembled and detached from the tire 2.

Further, when the wheel 1A is mounted on the tire 2, the assembly is performed according to the reverse procedure of the above-described disassembly procedure. That is, the in-side half wheel 10 and the out-side half wheel 20 are brought into contact with each other at the mating surfaces 10a and 20a at a given position of the axle hub 4, the wheel coupling bolts 7 are inserted into the outer periphery side bolt holes 13 and 23 of the in-side half wheel 10 and the out-side half wheel 20 from the in-side half wheel 10 side, and the nuts 9A are tightened to the wheel coupling bolts 7 from the out-side half wheel 20 side. Then, air is supplied into the tire 2 through the valve 5.

Then, when given inner pressure has been obtained, supply of air is stopped, and the outer surface 41a of the hub flange 41 and the mating surface 20a of the out-side half wheel 20 are put together and the hub bolts 8 are inserted into the hub bolt holes 42 of the hub flange 41 and the inner periphery side bolt holes 24 of the out-side half wheel 20 from the in-side half wheel 10 side. The hub nuts 9B are tightened to the hub bolts 8 from the out-side half wheel 20 side, and thus assembly to mount the wheel 1A on the tire 2 is completed.

Next, a function of the wheel 1A divided into two is described based on the drawings.

As shown in FIG. 1, in the wheel 1A of this embodiment, in the out-side half wheel 20, the wheel coupling bolts 7 which are mounted on the in-side half wheel 10 and the hub bolts 8 which are mounted on the hub flange 41 of the axle hub 4 are separately mounted. In this way, the assembly and disassembly of the in-side half wheel 10 and the out-side half wheel 20 and the assembly and disassembly of the out-side half wheel 20 and the axle hub 4 can be prevented from being performed at the same time.

That is, when the tire 2 is replaced, the wheel with a tire can be detached from the axle hub 4 by first detaching the hub bolts 8. At this time, since the in-side half wheel 10 and the out-side half wheel 20 are joined together by the wheel coupling bolts 7, it is possible to maintain a good working state without separation of the in-side half wheel 10 and the out-side half wheel 20 due to the inner pressure of the tire 2.

Further, the out-side half wheel 20 is mounted on the axle hub 4. For this reason, even if the wheel coupling bolts 7 are loosened mistakenly, since the out-side half wheel 20 and the axle hub 4 are joined together by the hub bolts 8, the object that may be blown due to the inner pressure of the tire 2 is the in-side half wheel 10. Accordingly, there is a safety advantage that the wheel does not fly toward the outer worker side.

Further, the wheel 1A is divided into two, so it is not necessary to use a hydraulic press in disassembly and assembly work of a tire with an inner safety wheel and a special jig is not also required.

In addition, by setting an offset between the in-side half wheel 10 and the out-side half wheel 20 to be zero, it becomes possible to manufacture the in-side half wheel 10 and the out-side half wheel 20 by using a single mold, and thus a reduction in cost can be attained. On the other hand, it is also possible to apply an offset by shifting the positions of the mating surface 10a of the in-side half wheel 10 and the mating surface 20a of the out-side half wheel 20. Accordingly, when the wheel 1A is divided into two, it is also possible to make it have a shape matching the structure of a tire mounting section.

Further, the mating surface 10a of the in-side half wheel 10 is provided with the convex portion 14 protruding to the mating surface 20a side of the out-side half wheel 20 to extend over the entire circumference in the circumferential direction, and the convex portion 14 and the concave portion 25 are engaged with each other, so misalignment of the in-side half wheel 10 and the out-side half wheel 20 with respect to the axle P can be prevented.

Further, when the in-side half wheel 10 and the out-side half wheel 20 divided into two are assembled, since it become possible to easily coaxially position both the divided wheels 10 and 20 by engaging the convex portion 14 with the concave portion 25, the assembly work can be made more efficient.

In the vehicle wheel, the running wheel, the vehicle, and the method of assembling and disassembling the vehicle wheel according to the first embodiment described above, the wheel coupling bolts 7 which are mounted on the in-side half wheel 10 and the hub bolts 8 which are mounted on the axle hub 4 are separately mounted and the out-side half wheel 20 is mounted on the axle hub 4. For this reason, even if the wheel coupling bolts 7 are mistakenly loosened when the tire 2 is replaced, since the out-side half wheel 20 and the axle hub 4 are joined together by the second bolts, flying of the wheel toward the outer worker side can be prevented. Therefore, improvement in work efficiency and workability and safety pertaining to assembly and disassembly can be attained.

Next, other embodiments of the vehicle wheel, the running wheel, the vehicle, and the method of assembling and disassembling the vehicle wheel according to the present invention are described based on the accompanying drawings. However, with respect to a member or a portion equal to or similar to that in the first embodiment described above, the same reference numeral is used and description is omitted, and a configuration different from that in the first embodiment is described.

Second Embodiment

Figure 4:
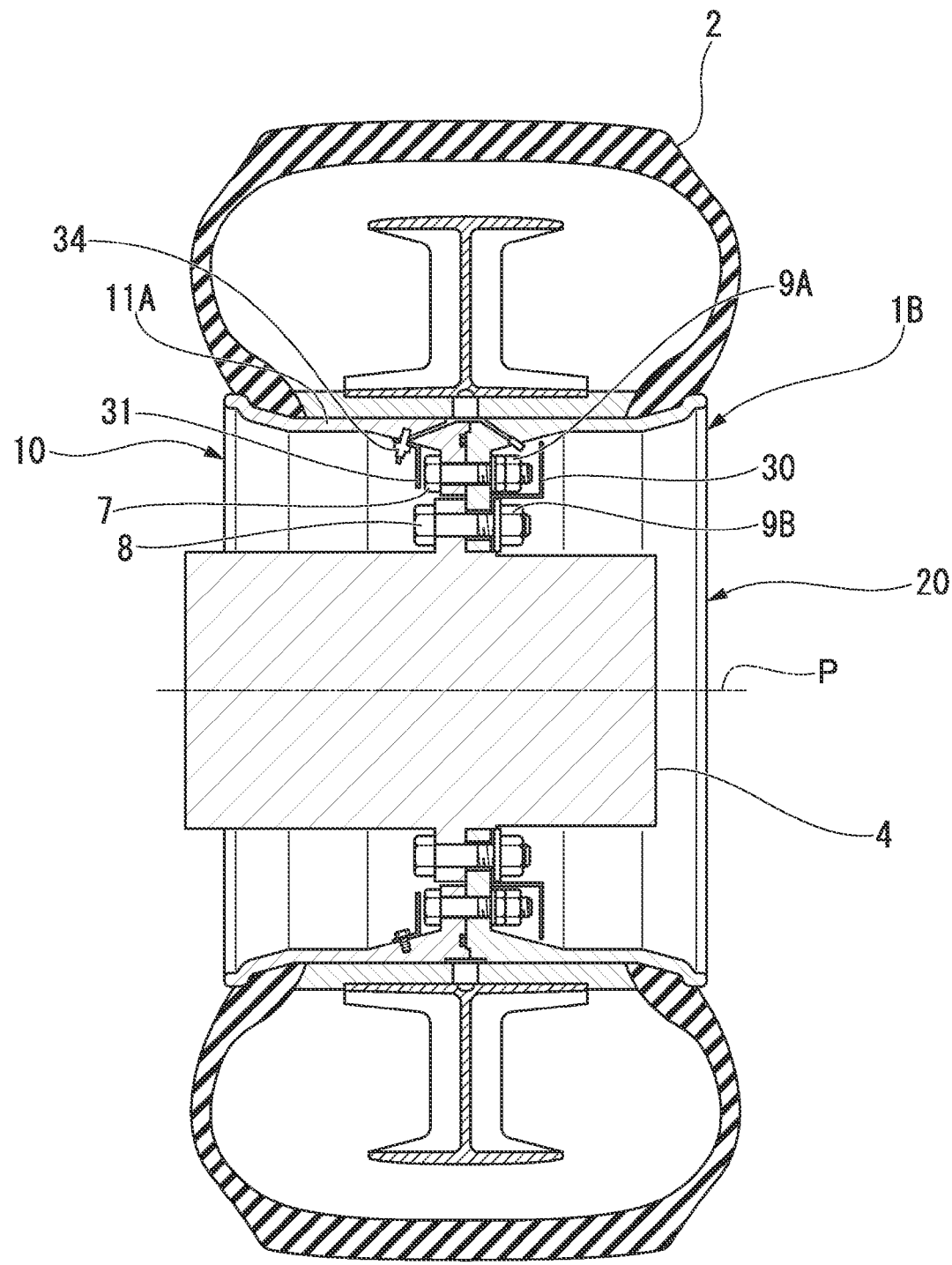
FIG. 4 is a cross-sectional view showing a running wheel according to a second embodiment of the present invention.
Figure 5:
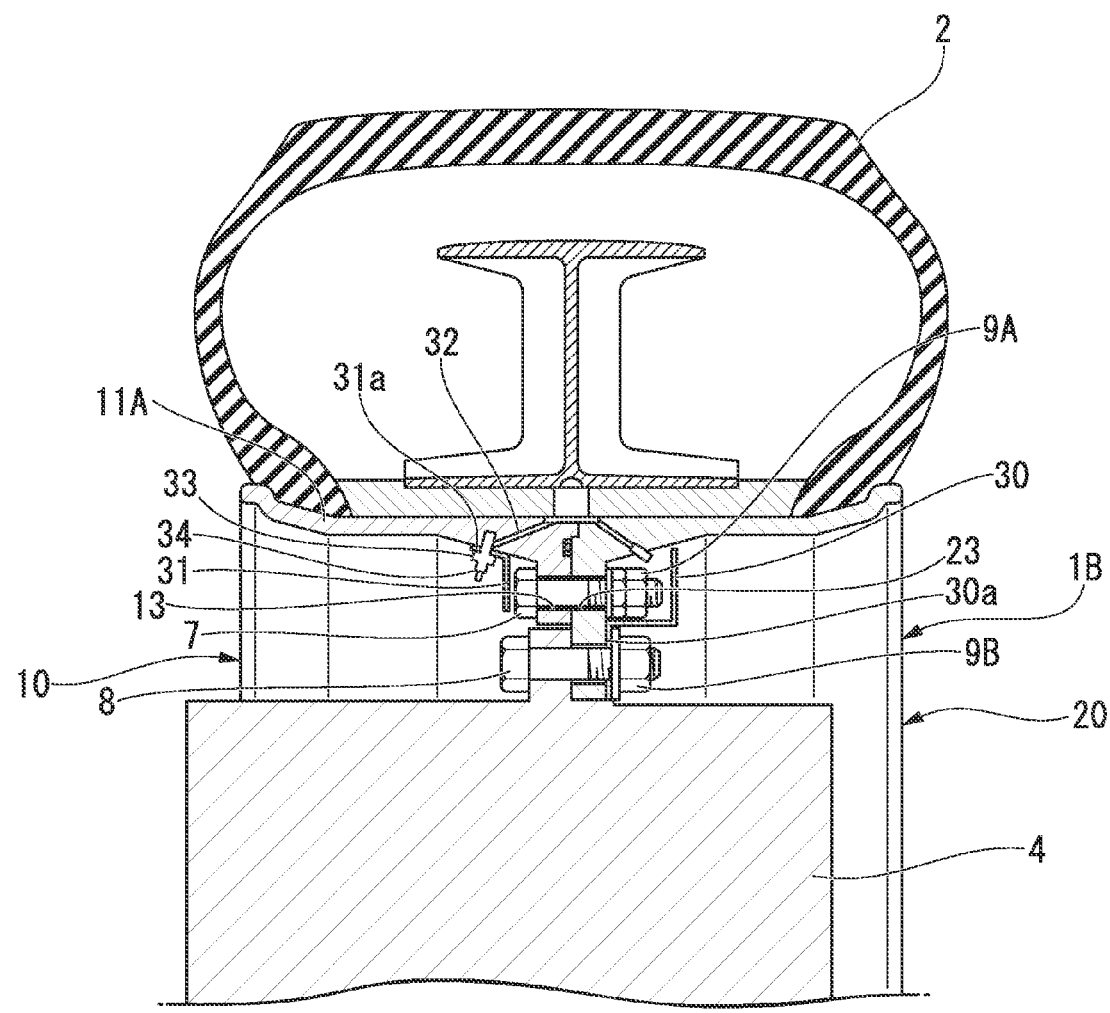
FIG. 5 is a partial enlarged view of the wheel shown in FIG. 4, corresponding to FIG. 3.

As shown in FIGS. 4 and 5, a wheel 1B (a vehicle wheel) according to a second embodiment is provided with a first cover body 30 that covers the nuts 9A which are screwed onto the wheel coupling bolts 7, and a second cover body 31 that covers the wheel coupling bolts 7 inserted into the outer periphery side bolt holes 13 and 23 of the in-side half wheel 10 and the out-side half wheel 20 from the in-side half wheel 10 side.

The first cover body 30 is jointed by the hub nuts 9B which are screwed onto the hub bolts 8. That is, the first cover body 30 is provided with a locking portion 30a having bolt holes into which a leading end of the hub bolts 8 are inserted, and has the shape of a flat plate which overhangs outward from the locking portion 30a and is bent so as to cover the outer periphery side of the nuts 9A.

Then, in the in-side half wheel 10, an air hole 32 communicating with the rim outer circumferential surface thereof is mounted. A whistle mechanism section 34 which is fixed by a third nut 33 and emits a warning sound due to air flowing through the air hole 32 toward the inner circumference side from the rim outer circumference side is mounted at an end portion on the rim inner circumference side of the air hole 32.

Figure 6:
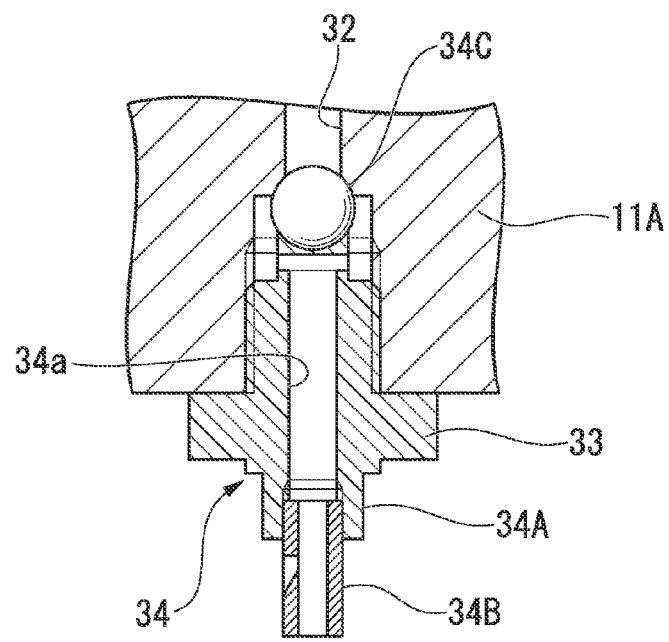
FIG. 6 is a cross-sectional side view showing a whistle mechanism section.

The whistle mechanism section 34 is more specifically described using FIG. 6. The whistle mechanism section 34 is provided with a pushing screw 34A, a whistle main body 34B mounted at a protruding end of the pushing screw 34A and communicating with a through-hole 34a, and a ball valve 34C which opens and closes an air flow path of the air hole 32 by the screwed amount of the pushing screw 34A. The pushing screw 34A is screwed into a female screw portion formed in the end portion on the rim inner circumference side of the air hole 32 and has the through-hole 34a communicating with the air hole 32.

The third nut 33 is integrally fixed to an outer circumference of the pushing screw 34A. By tightening the third nut 33, the pushing screw 34A is tightened into the female screw portion and presses the ball valve 34C at a leading end thereof, so the air hole 32 can be closed. On the other hand, by loosening the third nut 33, the leading end of the pushing screw 34A retracts to the rim inner circumference side and the ball valve 34C is opened, and thus air in the tire 2 is released through the through-hole 34a while emitting a warning sound at the whistle main body 34B.

The second cover body 31 is jointed by the third nut 33 of the whistle mechanism section 34, is provided with a locking portion 31a having a bolt hole into which the pushing screw 34A is inserted, and has the shape of a flat plate which is bent from the locking portion 31a so as to cover the outer periphery side of the wheel coupling bolts 7. That is, the second cover body 31 is mounted by disposing the locking portion 31a between the third nut 33 and the rim section 11A.

According to the wheel 1B related to the second embodiment of the present invention, since the nuts 9A for the wheel coupling bolts 7 joining the in-side half wheel 10 and the out-side half wheel 20 together are covered by the first cover body 30, the nuts 9A are not visible from the outside. Then, since the nuts 9A cannot be loosened from the outside unless the first cover body 30 is removed, it can be prevented that the in-side half wheel 10 and the out-side half wheel 20 are separated from each other by mistakenly removing the wheel coupling bolts 7 before the out-side half wheel 20 and the axle hub 4 are detached from each other.

Then, the first cover body 30 can be detached from the out-side half wheel 20 by loosening and removing the hub nuts 9B for the hub bolts 8. For this reason, when the wheel 1B is disassembled, a disassembly procedure to first detach the out-side half wheel 20 and the axle hub 4 from each other, then loosen the nuts 9A, and separate the in-side half wheel 10 and the out-side half wheel 20, can be carried out.

Since the wheel coupling bolts 7 joining the in-side half wheel 10 and the out-side half wheel 20 together are covered by the second cover body 31, the wheel coupling bolts 7 are not visible from the outside. Since the wheel coupling bolts 7 cannot be removed unless the second cover body 31 is removed, it can be prevented that the in-side half wheel 10 and the out-side half wheel 20 are separated from each other by mistakenly removing the wheel coupling bolts 7 before the out-side half wheel 20 and the axle hub 4 are detached from each other.

Then, after the wheel is detached from the axle hub 4, the second cover body 31 can be detached from the in-side half wheel 10 by loosening and removing the third nut 33 of the whistle mechanism section 34. That is, when the in-side half wheel 10 and the out-side half wheel 20 are disassembled, an attempt to detach the second cover body without releasing air in the tire 2 through the air valve 5 is made. In this case, when the third nut 33 of the whistle mechanism section 34 is loosened, air in the tire 2 flows to the rim inner circumference side through the air hole 32, and therefore the whistle mechanism section 34 emits a warning sound. For this reason, after the inner pressure in the inside of the tire 2 is reduced until the warning sound disappears, the second cover body 31 can be detached. Then, a disassembly procedure to loosen the nuts 9A and separate the in-side half wheel 10 and the out-side half wheel 20 from each other can be carried out.

Third Embodiment

Figure 7:
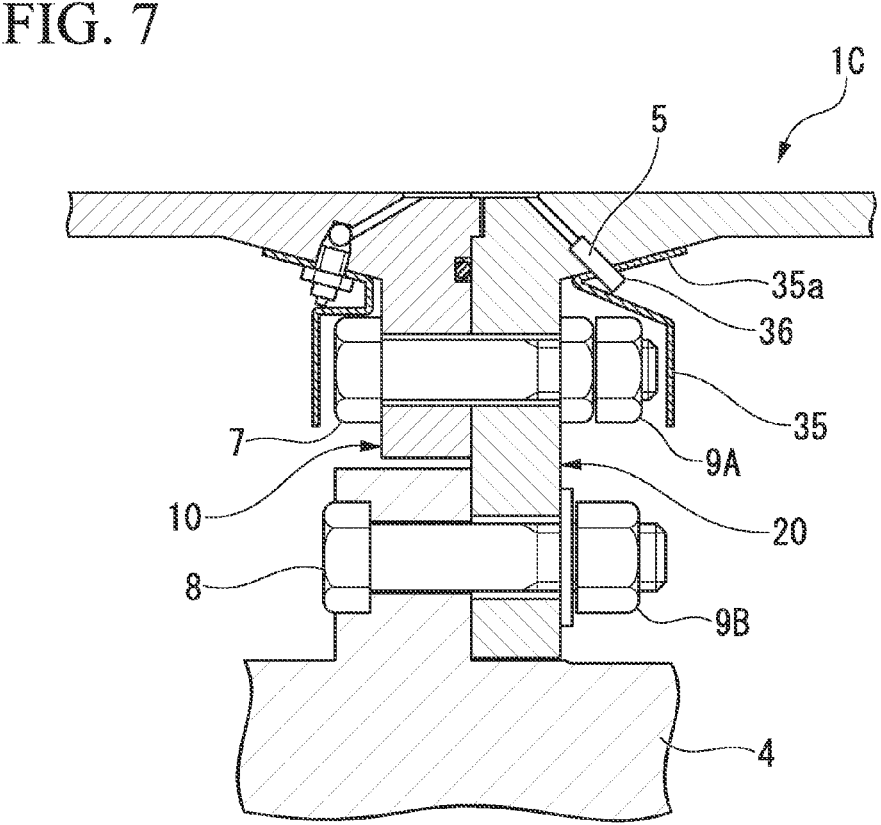
FIG. 7 is a partial cross-sectional view showing a wheel according to a third embodiment of the present invention.

Next, in a wheel 1C (a vehicle wheel) according to a third embodiment shown in FIG. 7, in place of the first cover body 30 (refer to FIG. 4) according to the second embodiment described above, a third cover body 35 that covers the nuts 9A which are screwed onto the wheel coupling bolts 7 is mounted in a state of being jointed to an opening portion of the valve 5 mounted at the out-side half wheel 20 and communicating with the inside of the tire, by a fourth nut 36.

The third cover body 35 is provided with a locking portion 35a having a bolt hole into which the valve 5 is inserted, and has the shape of a flat plate in which is bent from the locking portion 35a so as to cover the outer circumference side of the nuts 9A.

In this case, since the nuts 9A for the wheel coupling bolts 7 joining the in-side half wheel 10 and the out-side half wheel 20 together are covered by the third cover body 35, the nuts 9A are not visible from the outside. Then, since the nuts 9A cannot be loosened from the outside unless the third cover body 35 is removed, it can be prevented that the in-side half wheel 10 and the out-side half wheel 20 are separated from each other by mistakenly removing the wheel coupling bolts 7 before the out-side half wheel 20 and the axle hub 4 are detached from each other.

Then, after the wheel 1C is detached from the axle hub 4, the third cover body 35 can be detached from the out-side half wheel 20 by loosening and removing the fourth nut 36 from the third cover body 35. That is, when the in-side half wheel 10 and the out-side half wheel 20 are disassembled, in a case where an attempt to detach the third cover body 35 without releasing air in the tire 2 is made, when the fourth nut 36 is loosened, air in the tire 2 flows to the outside of the out-side half wheel 20 through the valve 5, and after the inner pressure in the inside of the tire 2 is reduced, the third cover body 35 can be detached. Then, a disassembly procedure to loosen and remove the nut 9A and separate the in-side half wheel 10 and the out-side half wheel 20 from each other can be carried out.

While the embodiments of the vehicle wheel, the running wheel, the vehicle, and the method of assembling and disassembling the vehicle wheel according to the present invention have been described above, the present invention is not limited to the above-described embodiments and a change can be appropriately made without departing from the scope of the present invention.

For example, in the embodiments, an inner safety wheel is incorporated in the tire 2. However, it is also possible to apply the present invention to a tire in which an inner safety wheel is not mounted.

Further, the number of wheel coupling bolts 7 and the number of hub bolts 8 can be changed appropriately depending on the conditions such as the size of the diameter of the wheel.

In addition, the shapes, the mounting positions, the mounting structures, or the like of the first cover body 30, the second cover body 31, and the third cover body 35 are not limited to the above-described embodiments and can be changed.

In addition, it is possible to appropriately substitute the constituent elements in the above-described embodiments for well-known constituent elements without departing from the scope of the present invention, and the embodiments described above may also be combined appropriately.

INDUSTRIAL APPLICABILITY

According to the vehicle wheel, the running wheel, the vehicle, and the method of assembling and disassembling the vehicle wheel related to the present invention, there is no chance of the wheel flying toward the outer worker side, and improvements in work efficiency and workability and safety pertaining to assembly and disassembly can be attained.

REFERENCE SIGNS LIST 1A, 1B, 1C: wheel (vehicle wheel)
2: tire
3: inner safety wheel
4: axle hub
7: wheel coupling bolt (first bolt)
8: hub bolt (second bolt)
9A: nut (first nut)
9B: hub nut (second nut)
10: in-side half wheel
10a: mating surface
13: outer periphery side bolt hole
14: convex portion (fit joint type mating portion)
20: out-side half wheel
23: outer periphery side bolt hole
24: inner periphery side bolt hole
25: concave portion
30: first cover body
31: second cover body
33: third nut
34: whistle mechanism section
35: third cover body
36: fourth nut
41: hub flange
42: hub bolt hole

The invention claimed is:

1. A vehicle wheel divided in an axial direction of a tire into two pieces which are an inside half wheel and an outside half wheel that are connected to each other and fixed to an axle hub, the vehicle wheel comprising:
   first bolts joining a first mating surface of the inside half wheel and a second mating surface of the outside half wheel together;
   second bolts joining the outside half wheel and the axle hub together; and
   a first cover body covering first nuts that are screwed onto the first bolts, the first cover body being jointed by second nuts that are screwed onto the second bolts,
   wherein the first bolts are screwed into the first nuts from an outside half wheel side, and the second bolts are screwed into the second nuts from the outside half wheel side,
   a protruding portion protruding from the first mating surface is formed on the first mating surface and extends over an entire circumference of the inside half wheel, and
   a recessed portion engaged with the protruding portion is formed on the second mating surface and extends an entire circumference of the outside half wheel.

2. The vehicle wheel according to claim 1, further comprising
   a second cover body covering the first bolts that are arranged at the inside half wheel side.

3. The vehicle wheel according to claim 2, wherein
   the inside half wheel is provided with an insertion hole communicating with a rim outer circumferential surface of the inside half wheel,
   a whistle mechanism section that is fixed by a third nut and emits a warning sound due to air flowing through the insertion hole toward an inner circumference side from a rim outer circumference side is mounted at an end portion on the rim inner circumference side of the insertion hole, and
   the second cover body is jointed by the third nut of the whistle mechanism section.

4. A running wheel comprising:
   the vehicle wheel according to claim 3; and
   the tire mounted on the vehicle wheel.

5. A vehicle comprising the running wheel according to claim 4.

6. A running wheel comprising:
   the vehicle wheel according to claim 2; and
   the tire mounted on the vehicle wheel.

7. A vehicle comprising the running wheel according to claim 6.

8. A running wheel comprising:
   the vehicle wheel according to claim 1; and
   the tire mounted on the vehicle wheel.

9. A vehicle comprising the running wheel according to claim 8.

10. A method of assembling and disassembling the vehicle wheel according to claim 1 which is provided with the tire, the method comprising:
    a first step of detaching the second bolts by loosening the second nuts from an outside of the outside half wheel;
    a second step of reducing inner pressure by releasing air in the tire;
    a third step of detaching the first bolts by loosening the first nuts from the outside of the outside half wheel; and
    a fourth step of separating the inside half wheel and the outside half wheel and detaching the inside half wheel and the outside half wheel from the tire,
    wherein the disassembling of the vehicle wheel is performed in order from the first step to the fourth step when the vehicle wheel is detached from the tire, and
    the assembling of the vehicle wheel is performed in reverse order of the disassembling when the vehicle wheel is mounted on the tire.

* * * * *